(12) United States Patent
Li et al.

(10) Patent No.: US 11,962,382 B2
(45) Date of Patent: Apr. 16, 2024

(54) TRANSMISSION CHANNEL STATE SENDING METHOD AND DEVICE, TRANSMISSION CHANNEL STATE RECEIVING METHOD AND DEVICE, AND STORAGE MEDIUM

(71) Applicant: ZTE Corporation, Guangdong (CN)

(72) Inventors: Yong Li, Guangdong (CN); Hao Wu, Guangdong (CN); Guozeng Zheng, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 310 days.

(21) Appl. No.: 17/513,702

(22) Filed: Oct. 28, 2021

(65) Prior Publication Data

US 2022/0231744 A1 Jul. 21, 2022

Related U.S. Application Data

(63) Continuation of application No. PCT/CN2020/085600, filed on Apr. 20, 2020.

(30) Foreign Application Priority Data

Apr. 30, 2019 (CN) .......................... 201910363745.7

(51) Int. Cl.
H04B 7/06 (2006.01)
(52) U.S. Cl.
CPC ......... H04B 7/0639 (2013.01); H04B 7/0617 (2013.01); H04B 7/0626 (2013.01); H04B 7/0634 (2013.01)
(58) Field of Classification Search
CPC .. H04B 7/0639; H04B 7/0617; H04B 7/0626; H04B 7/0634; H04B 7/0478; H04B 7/0456; H04B 7/0486
See application file for complete search history.

(56) References Cited

U.S. PATENT DOCUMENTS

| 10,491,276 B2 | 11/2019 | Park et al. |
| 10,687,346 B2* | 6/2020 | Tsai .......................... H04L 5/00 |
| 10,812,164 B2* | 10/2020 | Park ..................... H04B 7/0626 |

(Continued)

FOREIGN PATENT DOCUMENTS

| CN | 102647257 A | 8/2012 |
| CN | 103039047 A | 4/2013 |

(Continued)

OTHER PUBLICATIONS

Australian notice of acceptance issued in AU Patent Application No. 2020265943, dated Apr. 4, 2023, 3 pages.

(Continued)

*Primary Examiner* — Kibrom T Hailu (74) *Attorney, Agent, or Firm* — Perkins Coie LLP (57) ABSTRACT

Provided are a method and apparatus for sending a channel state, a method and apparatus for receiving a channel state and a storage medium. The method for sending a channel state includes following steps: a channel state report for characterizing a channel state comprising a precoding matrix is determined; and the channel state report for characterizing the channel state comprising the precoding matrix is sent, where the channel state report includes: a number of reported coefficients in coefficient matrixes for the precoding matrix and the reported coefficients in the coefficient matrixes for the precoding matrix; where the reported coefficients in the coefficient matrixes for the precoding matrix are used for indicating the precoding matrix.

8 Claims, 5 Drawing Sheets

(56) References Cited

U.S. PATENT DOCUMENTS

| | | |
|---|---|---|
| 2013/0083864 A1 | 4/2013 | Moulsley |
| 2019/0059013 A1* | 2/2019 | Rahman ............... H04B 7/0478 |
| 2019/0081678 A1 | 3/2019 | Park et al. |
| 2020/0295905 A1 | 9/2020 | Takeda et al. |
| 2021/0075485 A1 | 3/2021 | Chen et al. |
| 2021/0376887 A1 | 12/2021 | Wu et al. |

FOREIGN PATENT DOCUMENTS

| | | |
|---|---|---|
| CN | 103067064 A | 4/2013 |
| CN | 108540188 A | 9/2018 |
| CN | 110535506 A | 12/2019 |
| WO | 2017/196098 A1 | 11/2017 |
| WO | 2019/064561 A1 | 4/2019 |

OTHER PUBLICATIONS

European Search Report for EP Patent Application No. 20798156.4, dated Dec. 14, 2022, 10 pages.

3GPP TS 38.214 V15.5.0, Mar. 2019, Technical Specification, 3rd Generation Partnership Project; Technical Specification Group Radio Access Network; NR; Physical layer procedures for data (Release 15), 103 pages.

Australian Examination Report issued in AU Patent Application No. 2020265943, dated Jan. 31, 2023, 5 pages.

Korean office action issued in KR Patent Application No. 10-2021-7038972, dated Jan. 9, 2024, 6 pages. English translation included.

International Search Report and Written Opinion dated Jun. 3, 2020 for International Application No. PCT/CN2020/085600, filed on Apr. 20, 2020 (9 pages).

Indonesian office action issued in ID Patent Application No. P00202110900, dated Jan. 16, 2024, 6 pages. English translation included.

* cited by examiner

TRANSMISSION CHANNEL STATE SENDING METHOD AND DEVICE, TRANSMISSION CHANNEL STATE RECEIVING METHOD AND DEVICE, AND STORAGE MEDIUM

CROSS-REFERENCE TO RELATED APPLICATIONS

This application is a continuation of International Patent Application No. PCT/CN2020/085600, filed on Apr. 20, 2020, which claims priority to Chinese Patent Application No. 201910363745.7 filed with the China National Intellectual Property Administration (CNIPA) on Apr. 30, 2019, the contents of each of which are incorporated herein by reference in their entirety.

TECHNICAL FIELD

The present application relates to wireless communication networks, for example, to a method and apparatus for sending a channel state, a method and apparatus for receiving a channel state and a storage medium.

BACKGROUND

In the wireless communication technology, the precoding technology of the multi-antenna technology improves the performance of communication by applying precoding to transmit antennas. Generally, a transmitting side transmits a reference signal (RS) on a resource, and a receiving side uses the reference signal to measure channel state information (CSI) and then feeds back the measured channel state information in the form of precoding. Precoding is generally fed back in the manner of precoding matrix indicator (PMI) information. A constitution manner of precoding is that W=VCU where W denotes single-layer precoding. However, no transmission manner for the transmission of a channel state comprising such a precoding has been proposed.

SUMMARY

The present application provides a method and apparatus for sending a channel state, a method and apparatus for receiving a channel state and a storage medium.

An embodiment of the present application provides a method for sending a channel state. The method includes steps described below.

A channel state report for characterizing a channel state comprising a precoding matrix is determined.

The channel state report for characterizing the channel state comprising the precoding matrix is sent.

The channel state report includes: a number of reported coefficients in coefficient matrixes for the precoding matrix and the reported coefficients in the coefficient matrixes for the precoding matrix.

The reported coefficients in the coefficient matrixes for the precoding matrix are used for indicating the precoding matrix.

An embodiment of the present application provides a method for receiving a channel state. The method includes steps described below.

A channel state report for characterizing a channel state comprising a precoding matrix is received, where the channel state report includes: a number of reported coefficients in coefficient matrixes for the precoding matrix and the reported coefficients in the coefficient matrixes for the precoding matrix.

The reported coefficients in the coefficient matrixes for the precoding matrix are received according to the number of the reported coefficients in the coefficient matrixes for the precoding matrix.

The precoding matrix is acquired according to the reported coefficients in the coefficient matrixes for the precoding matrix.

An embodiment of the present application provides an apparatus for sending a channel state. The apparatus includes a determination module and a sending module.

The determination module is configured to determine a channel state report for characterizing a channel state comprising a precoding matrix.

The sending module is configured to send the channel state report for characterizing the channel state comprising the precoding matrix.

The channel state report includes: a number of reported coefficients in coefficient matrixes for the precoding matrix and the reported coefficients in the coefficient matrixes for the precoding matrix.

The reported coefficients in the coefficient matrixes for the precoding matrix are used for indicating the precoding matrix.

An embodiment of the present application provides an apparatus for receiving a channel state. The apparatus includes a reception module, a first processing module and a second processing module.

The reception module is configured to receive a channel state report for characterizing a channel state comprising a precoding matrix, where the channel state report includes: a number of reported coefficients in coefficient matrixes for the precoding matrix and the reported coefficients in the coefficient matrixes for the precoding matrix.

The first processing module is configured to receive the reported coefficients in the coefficient matrixes for the precoding matrix according to the number of the reported coefficients in the coefficient matrixes for the precoding matrix.

The second processing module is configured to acquire the precoding matrix according to the reported coefficients in the coefficient matrixes for the precoding matrix.

An embodiment of the present application provides a storage medium storing a computer program, where the computer program, when executed by a processor, implements any one of the methods of embodiments of the present application.

In an embodiment of the present application, a channel state report for characterizing a channel state comprising a precoding matrix may be sent. The channel state report includes: a number of reported coefficients in coefficient matrixes for the precoding matrix and the reported coefficients in the coefficient matrixes for the precoding matrix. The reported coefficients in the coefficient matrixes for the precoding matrix are used for indicating the precoding matrix. According to the embodiment of the present application, a transmission mechanism including a transmission manner of a channel state comprising a precoding matrix is implemented.

DETAILED DESCRIPTION

Embodiments of the present application are described hereinafter in detail in conjunction with the drawings.

Figure 1:
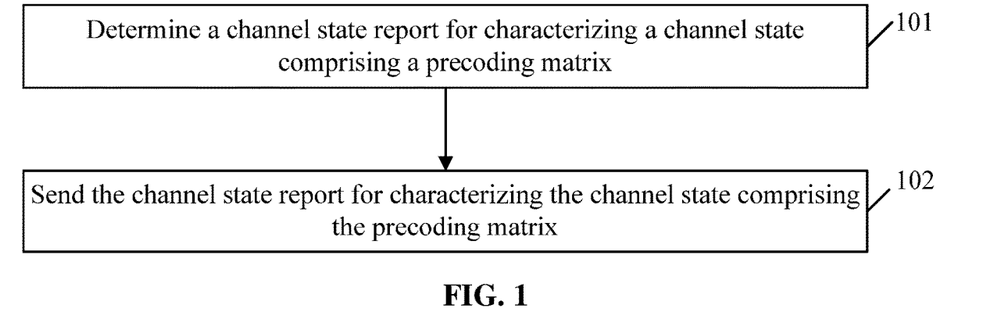
FIG. 1 is a flowchart of a method for sending a channel state according to an embodiment of the present application.

FIG. 1 is a flowchart of a method for sending a channel state according to an embodiment of the present application. As shown in FIG. 1, the method includes steps described below.

In step 101, a channel state report for characterizing a channel state comprising a precoding matrix is determined.

In step 102, the channel state report for characterizing the channel state comprising the precoding matrix is sent.

The channel state report includes: a number of reported coefficients in coefficient matrixes for the precoding matrix and the reported coefficients in the coefficient matrixes for the precoding matrix.

The reported coefficients in the coefficient matrixes for the precoding matrix are used for indicating the precoding matrix.

A channel state sending side reports the number of the reported coefficients in coefficient matrixes for the precoding matrix and the reported coefficients in the coefficient matrixes for the precoding matrix. Correspondingly, a channel state receiving side may receive the reported coefficients in the coefficient matrixes for the precoding matrix according to related information of the coefficient matrixes for the precoding matrix and acquire the precoding matrix. For example, the channel state receiving side may receive the reported coefficients in the coefficient matrixes for the precoding matrix according to the number of the reported coefficients in the coefficient matrixes for the precoding matrix and acquire the precoding matrix.

For example, the channel state sending side may report a sum of numbers of reported coefficients in the coefficient matrixes for all layers of a precoding matrix, or may report the number of reported coefficients in the coefficient matrix for each layer of a precoding matrix. For example, a rank of the precoding matrix is R, for R layers of the precoding matrix, the number of reported coefficients in the coefficient matrix for the first layer of the precoding matrix is $P_1$, the number of reported coefficients in the coefficient matrix for the second layer of the precoding matrix is $P_2$, . . . , the number of reported coefficients in the coefficient matrix for the r-th layer of the precoding matrix is $P_r$, . . . , and the number of reported coefficients in the coefficient matrix for the R-th layer of the precoding matrix is $P_R$. The sending side may report a sum $\overline{P}$ of numbers of reported coefficients in the coefficient matrixes for all layers of a precoding matrix, and $\overline{P}$ is the sum from $P_1$ to $P_R$. The channel state sending side may also report the number of reported coefficients in the coefficient matrix for each layer of a precoding matrix respectively, for example, report $P_1$, $P_2$, . . . , $P_r$, . . . , $P_R$, respectively, where R is a positive integer.

The method for sending a channel state of an embodiment of the present application includes steps described below.

In step 201, a channel state report for characterizing a channel state comprising a precoding matrix is determined.

In step 202, the channel state report for characterizing the channel state comprising the precoding matrix is sent.

The channel state report includes: a number of reported coefficients in coefficient matrixes for the precoding matrix and the reported coefficients in the coefficient matrixes for the precoding matrix.

The reported coefficients in the coefficient matrixes for the precoding matrix are used for indicating the precoding matrix.

A spatial domain dimension of the coefficient matrixes for the precoding matrix is obtained according to the number of the reported coefficients in the coefficient matrixes for the precoding matrix.

The spatial domain dimension of the coefficient matrixes for the precoding matrix is used for characterizing a number of spatial domain vectors composing the precoding matrix.

The spatial domain dimension of the coefficient matrixes for the precoding matrix has an association with the number of the reported coefficients in the coefficient matrixes for the precoding matrix. A large number of reported coefficients requires a large spatial domain dimension, whereas a small number of reported coefficients requires a small spatial domain dimension.

For example, the spatial domain dimension of the coefficient matrixes for the precoding matrix is determined by the sum $\overline{P}$ of the numbers of the reported coefficients in the coefficient matrixes for all layers of a precoding matrix. In one example, each layer of coefficient matrix for a precoding matrix has the same spatial domain dimension, which is determined by the sum $\overline{P}$ of the numbers of the reported coefficients. In another example, each layer of coefficient matrix for a precoding matrix may not have the same spatial domain dimension, and spatial domain dimensions are respectively determined by the sum $\overline{P}$ of the numbers of the reported coefficients. The spatial domain dimension of each layer of coefficient matrix for a precoding matrix is separately determined by the number of reported coefficients in the corresponding layer of coefficient matrix for a precoding matrix.

For another example, the spatial domain dimension of the coefficient matrixes for the precoding matrix is a product of the number of the reported coefficients in the coefficient matrixes for the precoding matrix and one coefficient. For another example, the spatial domain dimension of the coefficient matrixes for the precoding matrix is determined by a value interval within which the number of the reported coefficients in the coefficient matrixes for the precoding matrix resides. For another example, the spatial domain dimension of the coefficient matrixes for the precoding matrix is determined by a value set within which the number of the reported coefficients in the coefficient matrixes for the precoding matrix resides.

For another example, the channel state sending side receives a configuration parameter from the channel state receiving side, and the configuration parameter includes the spatial domain dimension of the coefficient matrixes for the precoding matrix. The spatial domain dimension of the reported coefficient matrix for a precoding matrix is jointly determined by the number of the reported coefficients in the coefficient matrixes for the precoding matrix and a spatial domain dimension of a configured coefficient matrix for a precoding matrix. For example, the spatial domain dimension of the reported coefficient matrix for a precoding matrix is a relatively small one of the number of the reported coefficients in the coefficient matrixes for the precoding matrix and the spatial domain dimension of the configured coefficient matrix for a precoding matrix. For another example, a number L' is determined by the number of the reported coefficients in the coefficient matrixes for the precoding matrix, and the spatial domain dimension of the reported coefficient matrix for a precoding matrix is determined by L' and the spatial domain dimension of the configured coefficient matrix for a precoding matrix; for example, the spatial domain dimension of the reported coefficient matrix for a precoding matrix is a relatively small one of L' and the spatial domain dimension of the configured coefficient matrix for a precoding matrix.

For another example, the channel state sending side receives a configuration parameter from the channel state receiving side, and the configuration parameter includes a maximum value of the number of reported coefficients in the coefficient matrixes for the precoding matrix. The spatial domain dimension of the reported coefficient matrix for a precoding matrix is jointly determined by the number of the reported coefficients in the coefficient matrixes for the precoding matrix and the maximum value, for example, is determined by a ratio of the number of the reported coefficients to the maximum value, or for another example, is determined by the number of the reported coefficients and a region or set in which the maximum value resides.

For another example, the number of the reported coefficients in the coefficient matrixes for the precoding matrix is 1, which indicates that the spatial domain dimension of the coefficient matrixes for the precoding matrix is 1.

In an exemplary implementation, the method further includes the following step: a frequency domain dimension of the coefficient matrixes for the precoding matrix is determined according to the number of the reported coefficients in the coefficient matrixes for the precoding matrix.

The frequency domain dimension of the coefficient matrixes for the precoding matrix is used for characterizing a number of frequency domain vectors composing the precoding matrix.

The frequency domain dimension of the coefficient matrixes for the precoding matrix has an association with the number of the reported coefficients in the coefficient matrixes for the precoding matrix. A large number of reported coefficients requires a large frequency domain dimension, whereas a small number of reported coefficients requires a small frequency domain dimension.

For example, the frequency domain dimension of the coefficient matrixes for the precoding matrix is determined by the sum $\overline{P}$ of the numbers of the reported coefficients in the coefficient matrixes for all layers of a precoding matrix. In one example, each layer of coefficient matrix for a precoding matrix has the same frequency domain dimension, which is determined by the sum $\overline{P}$ of the numbers of the reported coefficients. In another example, each layer of coefficient matrix for a precoding matrix may not have the same frequency domain dimension, and frequency domain dimensions are respectively determined by the sum $\overline{P}$ of the numbers of the reported coefficients. The frequency domain dimension of each layer of coefficient matrix for a precoding matrix is separately determined by the number of reported coefficients in the corresponding layer of coefficient matrix for a precoding matrix.

For another example, the frequency domain dimension of the coefficient matrixes for the precoding matrix is a product of the number of the reported coefficients in the coefficient matrixes for the precoding matrix and one coefficient. For another example, the frequency domain dimension of the coefficient matrixes for the precoding matrix is determined by a value interval in which the number of the reported coefficients in the coefficient matrixes for the precoding matrix resides. For another example, the frequency domain dimension of the coefficient matrixes for the precoding matrix is determined by a value set in which the number of the reported coefficients in the coefficient matrixes for the precoding matrix resides.

For another example, the channel state sending side receives a configuration parameter from the channel state receiving side, and the configuration parameter includes the frequency domain dimension of the coefficient matrixes for the precoding matrix. The frequency domain dimension of the reported coefficient matrix for a precoding matrix is jointly determined by the number of the reported coefficients in the coefficient matrixes for the precoding matrix and a frequency domain dimension of a configured coefficient matrix for a precoding matrix. For example, the frequency domain dimension of the reported coefficient matrix for a precoding matrix is a relatively small one of the number of the reported coefficients in the coefficient matrixes for the precoding matrix and the frequency domain dimension of the configured coefficient matrix for a precoding matrix. For another example, a number M' is determined by the number of the reported coefficients in the coefficient matrixes for the precoding matrix, and the frequency domain dimension of the reported coefficient matrix for a precoding matrix is determined by M' and the frequency domain dimension of the configured coefficient matrix for a precoding matrix; for example, the frequency domain dimension of the reported coefficient matrix for a precoding matrix is a relatively small one of M' and the frequency domain dimension of the configured coefficient matrix for a precoding matrix.

For another example, the channel state sending side receives a configuration parameter from the channel state receiving side, and the configuration parameter includes a maximum value of the number of reported coefficients in the coefficient matrixes for the precoding matrix. The frequency domain dimension of the reported coefficient matrix for a precoding matrix is jointly determined by the number of the reported coefficients in the coefficient matrixes for the precoding matrix and the maximum value, for example, is determined by a ratio of the number of the reported coefficients to the maximum value, or for another example, is determined by the number of the reported coefficients and a region or set in which the maximum value resides.

For another example, the number of the reported coefficients in the coefficient matrixes for the precoding matrix is 1, which indicates that the frequency domain dimension of the coefficient matrixes for the precoding matrix is 1.

In an exemplary implementation, the method further includes the following step: a rank of the precoding is determined according to the number of the reported coefficients in the coefficient matrixes for the precoding matrix.

For example, the rank of the precoding is determined by a set in which the number of the reported coefficients in the coefficient matrixes for the precoding matrix resides. For another example, the rank of the precoding is jointly determined by the number of the reported coefficients in the coefficient matrixes for the precoding matrix and a value of a field for reporting the rank. In one example, the number of the reported coefficients in the coefficient matrixes for the precoding matrix being greater than a threshold enables the value of the field for reporting the rank; in another example, the number of the reported coefficients in the coefficient matrixes for the precoding matrix is less than a threshold, and the rank of the precoding is determined as 1. For another example, the number of the reported coefficients in the coefficient matrixes for the precoding matrix is 1, which indicates that the rank of the precoding is 1. For another example, the number of the reported coefficients in the coefficient matrixes for the precoding matrix is 0, which indicates that the rank of the precoding is 1.

In an exemplary implementation, the method further includes the following step: an information content of the channel state report is determined according to the number of the reported coefficients in the coefficient matrixes for the precoding matrix.

For example, a field for reporting the rank is determined by the number of the reported coefficients in the coefficient matrixes for the precoding matrix to indicate candidate precoding. For example, whether the reported coefficients in the coefficient matrixes for the precoding matrix are reported is determined according to the number of the reported coefficients in the coefficient matrixes for the precoding matrix. For example, the number of the reported coefficients in the coefficient matrixes for the precoding matrix is 1, so that the reported coefficients in the coefficient matrixes for the precoding matrix are not reported.

In an exemplary implementation, the channel state report is indicated by a first field, and a state of the first field includes a first state set and a second state set. The number of the reported coefficients in the coefficient matrixes for the precoding matrix is indicated according to a state in the first state set of the first field. The precoding is indicated according to a state in the second state set of the first field. For example, the number of the reported coefficients in the coefficient matrixes for the precoding matrix is indicated by part of states of the first field, and the precoding is indicated by another part of states of the first field.

Herein, "first" in the first field, "first" in the first state set and "second" in the second state set are used merely for descriptive differentiation and do not represent orders.

One field is adopted to report the number of the reported coefficients in the coefficient matrixes for the precoding matrix, a bit combination of the field has multiple states, for example, Y1 states, and the number of possible values of the number of the reported coefficients in the coefficient matrixes for the precoding matrix is Y2, where Y1 is greater than Y2. Y2 states in the bit combination of the field are used for indicating the number of the reported coefficients in the coefficient matrixes for the precoding matrix, and part of remaining states of the bit combination is used for indicating a precoding matrix from candidate precoding matrixes. The field is the bit combination.

For example, the field for indicating the number of the reported coefficients in the coefficient matrixes for the precoding matrix has 4 bits, that is, a total of 16 states. Possible values of the number of the reported coefficients in the coefficient matrixes for the precoding matrix are {0, 1, . . . , 10}, that is, the number of values of the number of the reported coefficients in the coefficient matrixes for the precoding matrix is 11. Therefore, 11 states of the 16 states of the field are used for indicating the number of the reported coefficients in the coefficient matrixes for the precoding matrix, and part of the remaining 5 states is used for indicating selected precoding from candidate precoding. For another example, the field for indicating the number of the reported coefficients in the coefficient matrixes for the precoding matrix has 4 bits, that is, a total of 16 states. Possible values of the number of the reported coefficients in the coefficient matrixes for the precoding matrix are {1, . . . , 10}, that is, the number of values of the number of the reported coefficients in the coefficient matrixes for the precoding matrix is 10. Therefore, 10 states of the 16 states of the field are used for indicating the number of the reported coefficients in the coefficient matrixes for the precoding matrix, and part of the remaining 6 states is used for indicating selected precoding from candidate precoding.

In an exemplary implementation, the channel state report is indicated by a first field, and a state of the first field includes a first state set and a second state set. For example, the number of the reported coefficients in the coefficient matrixes for the precoding matrix is indicated by part of states of the first field, and another part of states of the first field is reserved. Different from the above example, reserved states may be included in the state set in addition to the first states and second states described above.

One field is adopted to report the number of the reported coefficients in the coefficient matrixes for the precoding matrix, a bit combination of the field has multiple states, for example, Y1 states, and the number of possible values of the number of the reported coefficients in the coefficient matrixes for the precoding matrix is Y2, where Y1 is greater than Y2. Y2 states in the bit combination of the field are used for indicating the number of the reported coefficients in the coefficient matrixes for the precoding matrix, and part of remaining states of the bit combination is reserved. The field is the bit combination. A certain state being reserved refers to that no report information is allocated to the certain state.

For example, the field for indicating the number of the reported coefficients in the coefficient matrixes for the precoding matrix has 4 bits, that is, a total of 16 states. Possible values of the number of the reported coefficients in the coefficient matrixes for the precoding matrix are {0, 1, . . . , 10}, that is, the number of values of the number of the reported coefficients in the coefficient matrixes for the precoding matrix is 11. Therefore, 11 states of the 16 states of the field are used for indicating the number of the reported coefficients in the coefficient matrixes for the precoding matrix, and part of the remaining 5 states is reserved. For example, the field for indicating the number of the reported coefficients in the coefficient matrixes for the precoding matrix has 4 bits, that is, a total of 16 states. Possible values of the number of the reported coefficients in the coefficient matrixes for the precoding matrix are {1, . . . , 10}, that is, the number of values of the number of the reported coefficients in the coefficient matrixes for the precoding matrix is 10. Therefore, 10 states of the 16 states of the field are used for indicating the number of the reported coefficients in the coefficient matrixes for the precoding matrix, and part of the remaining 6 states is reserved.

In an exemplary implementation, the channel state report includes two parts. A first part of the channel state report is mapped on a first sequence. A second part of the channel state report is mapped on a second sequence, where the second part includes N fragments, and N is an integer greater than 1.

The information of the report is structured to facilitate the transmission of the report. Different fragments have different priorities.

For example, the second part includes two fragments, and for another example, the second part includes three fragments.

In an exemplary implementation, the number N of the fragments included in the second part of the channel state report is included in the first part of the channel state report.

The number of the fragments of the second part is included in the first part of the report, which facilitates the reception of information at the channel state receiving side.

For example, the first part of the report uses one field to indicate the number of the fragments of the second part. For another example, a field for transmitting other information is used for indicating the number of the fragments of the second part.

In an exemplary implementation, the second part of the channel state report includes at least two fragments, and a first fragment of the at least two fragments has a higher priority than other fragments sequenced after the first fragment. A matrix indicating the reported coefficients in the coefficient matrixes for the precoding matrix is included in the first fragment, and the reported coefficients in the coefficient matrixes for the precoding matrix are included in other fragments sequenced after the first fragment.

For example, the second part includes two fragments, and the first fragment has a higher priority than the second fragment. The matrix indicating the reported coefficients in the coefficient matrixes for the precoding matrix is included in the first fragment, and the reported coefficients in the coefficient matrixes for the precoding matrix are included in the second fragment.

For another example, the second part includes three fragments, the first fragment has a higher priority than the second fragment, and the second fragment has a higher priority than the third fragment. The matrix indicating the reported coefficients in the coefficient matrixes for the precoding matrix is included in the first fragment, part of the reported coefficients in the coefficient matrixes for the precoding matrix are included in the second fragment, and the remaining part of the reported coefficients in the coefficient matrixes for the precoding matrix are included in the third fragment.

In an exemplary implementation, the second part of the channel state report includes at least two fragments, a first fragment of the at least two fragments has a higher priority than other fragments sequenced after the first fragment, and a second fragment has a higher priority than other fragments sequenced after the second fragment. A portion of a matrix indicating the reported coefficients in the coefficient matrixes for the precoding matrix and correspondingly-indicated reported coefficients in the coefficient matrixes for the precoding matrix are included in the second fragment.

For example, the second part includes two fragments, the first fragment has a higher priority than the second fragment, and a portion of the matrix indicating the reported coefficients in the coefficient matrixes for the precoding matrix and correspondingly-indicated coefficients are included in the second fragment.

For another example, the second part includes three fragments, the first fragment has a higher priority than the second fragment, and the second fragment has a higher priority than the third fragment. A portion of the matrix indicating the reported coefficients in the coefficient matrixes for the precoding matrix and correspondingly-indicated coefficients are included in the second fragment, and the remaining portion of the matrix indicating the reported coefficients in the coefficient matrixes for the precoding matrix and remaining correspondingly-indicated coefficients are included in the third fragment.

In an exemplary implementation, the second part of the channel state report includes at least two fragments, a first fragment of the at least two fragments has a higher priority than other fragments sequenced after the first fragment, and a second fragment has a higher priority than other fragments sequenced after the second fragment. Part of the reported coefficients in the coefficient matrixes for the precoding matrix is included in the second fragment. The reported coefficients in the coefficient matrixes for the precoding matrix are divided according to columns of the coefficient matrixes for the precoding matrix.

For example, the second part includes two fragments, the first fragment has a higher priority than the second fragment, part of the reported coefficients is included in the second fragment, and the reported coefficients are divided according to columns of the coefficient matrixes for the precoding matrix.

For another example, the second part includes three fragments, the first fragment has a higher priority than the second fragment, and the second fragment has a higher priority than the third fragment. Part the reported coefficients is included in the second fragment, the remaining part of the reported coefficients in the coefficient matrixes for the precoding matrix is included in the third fragment, and the reported coefficients are divided according to columns of the coefficient matrixes for the precoding matrix.

In an exemplary implementation, the number of the reported coefficients in the coefficient matrixes for the precoding matrix is determined by a number of resources used by the channel state report.

The channel state report is generally transmitted by using certain wireless resources, and the number of the reported coefficients in the coefficient matrixes for the precoding matrix has an association with the number of resources used by the report.

For example, a range of the number of the reported coefficients in the coefficient matrixes for the precoding matrix is determined by an interval in which the number of resources used by the report resides.

For another example, a range of the number of the reported coefficients in the coefficient matrixes for the precoding matrix is determined by the number of resources used by the report and a transmission code rate.

In an exemplary implementation, the frequency domain dimension of the coefficient matrixes for the precoding matrix is determined by a number of resources used by the channel state report.

The channel state report is generally transmitted by using certain wireless resources, and the frequency domain dimension of the coefficient matrixes for the precoding matrix has an association with the number of resources used by the report.

For example, the frequency domain dimension of the coefficient matrixes for the precoding matrix is determined by an interval in which the number of resources used by the report resides.

For another example, the frequency domain dimension of the coefficient matrixes for the precoding matrix is determined by the number of resources used by the report and a transmission code rate.

In an exemplary implementation, the number N of the fragments included in the second part of the channel state report is determined by a number of resources used by the channel state report.

The channel state report is generally transmitted by using certain wireless resources, and the number of the fragments included in the second part has an association with the number of resources used by the report.

For example, the number of the fragments included in the second part is determined by an interval in which the number of resources used by the report resides.

For another example, the number of the fragments included in the second part is determined by the number of resources used by the report and a transmission code rate.

In an exemplary implementation, the channel state report further includes: a location of a precoding frequency domain unit supplemented in the channel state report.

To reduce the complexity of the device, some frequency domain units need to be supplemented with respect to frequency domain units configured for reporting the channel state. Precoding corresponding to these supplemented precoding frequency domain units should be discarded by the channel state receiving side. Therefore, the channel state receiving side needs to know the location of the supplemented precoding frequency domain units.

For example, the location of the supplemented precoding frequency domain units is reported in the first part. For another example, the location of the supplemented precoding frequency domain units is reported in the second part. For another example, the location of the supplemented precoding frequency domain units is reported in a first fragment of the second part.

In an exemplary implementation, the number of the reported coefficients in the coefficient matrixes for the precoding matrix is reported according to fragments.

The number of the reported coefficients in the coefficient matrixes for the precoding matrix is reported according to fragments, so that the receiving side can acquire information of the number of the reported coefficients on the corresponding fragment in the case of acquiring the number of the reported coefficients in the coefficient matrixes for the precoding matrix, and thus a length of the corresponding fragment can be determined and data on the corresponding fragment can be read.

For example, the second part includes two fragments, and the first part includes the number of reported coefficients in the coefficient matrixes for the precoding matrix on the second fragment. For another example, the second part includes three fragments, and the first part includes the number of reported coefficients in the coefficient matrixes for the precoding matrix on the second fragment and the number of reported coefficients in the coefficient matrixes for the precoding matrix on the third fragment, respectively.

For example, the second part includes two fragments, and the first part includes the number of reported coefficients in the coefficient matrixes for the precoding matrix on the first fragment and the number of reported coefficients in the coefficient matrixes for the precoding matrix on the second fragment, respectively. For another example, the second part includes three fragments, and the first part includes the number of reported coefficients in the coefficient matrixes for the precoding matrix on the first fragment, the number of reported coefficients in the coefficient matrixes for the precoding matrix on the second fragment and the number of reported coefficients in the coefficient matrixes for the precoding matrix on the third fragment, respectively.

Figure 2:
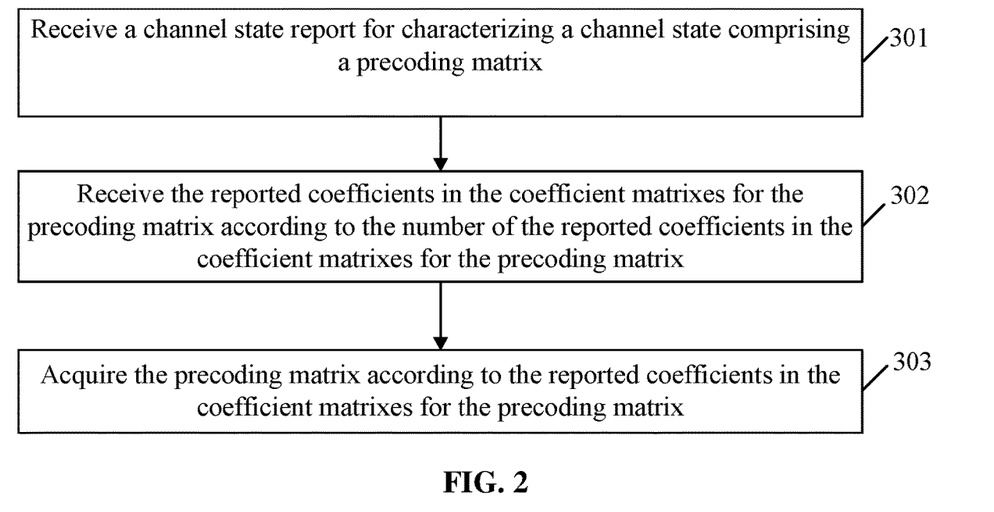
FIG. 2 is a flowchart of a method for receiving a channel state according to an embodiment of the present application.

FIG. 2 is a flowchart of a method for receiving a channel state according to an embodiment of the present application. As shown in FIG. 2, the method includes steps described below.

In step 301, a channel state report for characterizing a channel state comprising a precoding matrix is received.

The channel state report includes: a number of reported coefficients in coefficient matrixes for the precoding matrix and the reported coefficients in the coefficient matrixes for the precoding matrix.

In step 302, the reported coefficients in the coefficient matrixes for the precoding matrix are received according to the number of the reported coefficients in the coefficient matrixes for the precoding matrix.

In step 303, the precoding matrix is acquired according to the reported coefficients in the coefficient matrixes for the precoding matrix.

In an exemplary implementation, a spatial domain dimension of the coefficient matrixes for the precoding matrix is determined by the number of the reported coefficients in the coefficient matrixes for the precoding matrix. The spatial domain dimension of the coefficient matrixes for the precoding matrix is used for characterizing a number of spatial domain vectors composing the precoding matrix.

In an exemplary implementation, a frequency domain dimension of the coefficient matrixes for the precoding matrix is determined by the number of the reported coefficients in the coefficient matrixes for the precoding matrix. The frequency domain dimension of the coefficient matrixes for the precoding matrix is used for characterizing a number of frequency domain vectors composing the precoding matrix.

In an exemplary implementation, a rank of the precoding is determined by the number of the reported coefficients in the coefficient matrixes for the precoding matrix.

In an exemplary implementation, an information content of the channel state report is determined by the number of the reported coefficients in the coefficient matrixes for the precoding matrix.

In an exemplary implementation, the channel state report is indicated by a first field, and a state of the first field includes a first state set and a second state set. The number of the reported coefficients in the coefficient matrixes for the precoding matrix is indicated according to a state in the first state set of the first field. The precoding is indicated according to a state in the second state set of the first field.

In an exemplary implementation, the channel state report includes two parts. A first part of the channel state report is mapped on a first sequence. A second part of the channel state report is mapped on a second sequence, where the second part includes N fragments, and N is an integer greater than 1.

In an exemplary implementation, the number N of the fragments included in the second part of the channel state report is included in the first part of the channel state report.

In an exemplary implementation, the second part of the channel state report includes at least two fragments, and a first fragment of the at least two fragments has a higher priority than other fragments sequenced after the first fragment. A matrix indicating the reported coefficients in the coefficient matrixes for the precoding matrix is included in the first fragment, and the reported coefficients in the coefficient matrixes for the precoding matrix are included in other fragments sequenced after the first fragment.

In an exemplary implementation, the second part of the channel state report includes at least two fragments, a first fragment of the at least two fragments has a higher priority than other fragments sequenced after the first fragment, and a second fragment has a higher priority than other fragments sequenced after the second fragment. A Portion of a matrix indicating the reported coefficients in the coefficient matrixes for the precoding matrix and correspondingly-indicated reported coefficients in the coefficient matrixes for the precoding matrix are included in the second fragment.

In an exemplary implementation, the second part of the channel state report includes at least two fragments, a first fragment of the at least two fragments has a higher priority than other fragments sequenced after the first fragment, and a second fragment has a higher priority than other fragments sequenced after the second fragment. Part of the reported coefficients in the coefficient matrixes for the precoding matrix is included in the second fragment. The reported coefficients in the coefficient matrixes for the precoding matrix are divided according to columns of the coefficient matrixes for the precoding matrix.

In an exemplary implementation, the number of the reported coefficients in the coefficient matrixes for the precoding matrix is determined by a number of resources used by the channel state report.

In an exemplary implementation, the frequency domain dimension of the coefficient matrixes for the precoding matrix is determined by a number of resources used by the channel state report.

In an exemplary implementation, the number N of the fragments included in the second part of the channel state report is determined by a number of resources used by the channel state report.

In an exemplary implementation, the channel state report includes: a location of a precoding frequency domain unit supplemented in the channel state report.

In an exemplary implementation, the number of the reported coefficients in the coefficient matrixes for the precoding matrix is reported according to fragments.

Application Instance

The constitution manner of precoding matrix involved in the implementation is firstly described hereinafter by taking an example in which a network device is taken as a base station and one layer of precoding matrix in multiple layers is illustrated. The precoding matrix may be composed in the following manner:

W=VCU

W denotes single-layer precoding, which is a matrix of $N_{Tx}$ rows and $N_3$ columns. $N_{Tx}$ denotes the number of antenna ports. $N_3$ denotes the number of frequency domain units of a precoding matrix indicator (PMI). That is, the rows of W correspond to the antenna ports and the columns of W correspond to the frequency domain units.

One implementation of the matrix V is that $V=[v_0, v_1, \ldots, v_{L-1}]$, which is composed of L column vectors $v_1$; another implementation of the matrix V is that $$V = \begin{bmatrix} v_0, v_1, \ldots, v_{L-1} & 0 \\ 0 & v_0, v_1, \ldots, v_{L-1} \end{bmatrix},$$

which is composed of zero elements and L column vectors $v_1$; where $l=0,1,\ldots,L-1$, L is a positive integer, and the vectors $v_1$ are referred to as spatial domain vectors. $U=[u_0^T, u_1^T, \ldots, u_{M-1}^T]^T$, which is a matrix composed of M row vectors $u_m$. T denotes the transposition of the matrix; $m=0, 1, \ldots, M-1$, where M is a positive integer, and the vectors $u_m$ are referred to as frequency domain vectors.

The matrix C is used for making the spatial domain vectors and the frequency domain vectors compose precoding, which is referred to as a coefficient matrix for a precoding matrix. The matrix C is described below.

$$C = \begin{bmatrix} c_{0,0} & c_{0,1} & \cdots & c_{0,M-1} \\ c_{1,0} & c_{1,1} & \cdots & c_{1,M-1} \\ \vdots & \vdots & \cdots & \vdots \\ c_{L-1,0} & c_{L-1,1} & \cdots & c_{L-1,M-1} \end{bmatrix},$$

where C is a matrix of L rows and M columns, or $$C = \begin{bmatrix} c_{0,0} & c_{0,1} & \cdots & c_{0,M-1} \\ c_{1,0} & c_{1,1} & \cdots & c_{1,M-1} \\ \vdots & \vdots & \cdots & \vdots \\ c_{2L-1,0} & c_{2L-1,1} & \cdots & c_{2L-1,M-1} \end{bmatrix},$$

where C is a matrix of 2L rows and M columns, and elements of the matrix are coefficients of the column vectors in the matrix V and coefficients of the row vectors in the matrix U.

The number of spatial domain vectors composing the precoding is referred to as a spatial domain dimension of the coefficient matrix for the precoding matrix, and the number of frequency domain vectors composing the precoding is referred to as a frequency domain dimension of the coefficient matrix for the precoding matrix.

A terminal device feeds back the L vectors $v_1$ composing the matrix V to the base station, feeds back the M vectors $u_m$ composing the matrix U, indicates locations of fed-back elements in the matrix C by using a bit matrix $C_{map}$ of L rows and M columns or of 2L rows and M columns in the manner of bitmap, and feeds back indicated corresponding coefficients in the matrix C. The elements at the same locations in the matrix $C_{map}$ and the matrix C (that is, the first matrix) are in one to one correspondence, and coefficients in the matrix C not fed back and not indicated by the bitmap default to 0. The fed-back coefficients in the matrix C are the fed-back elements in the matrix C.

The vectors $v_1$ are selected from a predefined codebook. The vectors $u_m$ are selected from a predefined codebook. The number of elements in the vectors $u_m$ is referred to as the number $N_3$ of frequency domain units of a PMI and is equal to the number of basis vectors in the predefined codebook space where vectors $u_m$ are located. Accordingly, $N_3$ also denotes the number of basis vectors in the predefined codebook space where the vectors $u_m$ are located.

To control the resource overhead of the terminal feeding back the PMI and the accuracy of the feedback, the base station transmits a parameter $K_0$ for controlling the feedback report. The terminal feeds back at most $K_0$ coefficients in the matrix C to the base station.

If the precoding fed back by the terminal is used for the transmission of spatial domain layer 1, the rank of the precoding is referred to as 1; if the precoding fed back by the terminal is used for the transmission of spatial domain layer 2, the rank of the precoding is referred to as 2. Similarly, if the precoding fed back by the terminal is used for the transmission of spatial domain layer RI, the rank of the precoding is referred to as RI, and for example, RI=1, 2, 3, 4. The terminal feeds back the rank of the precoding and the precoding.

Figure 3:
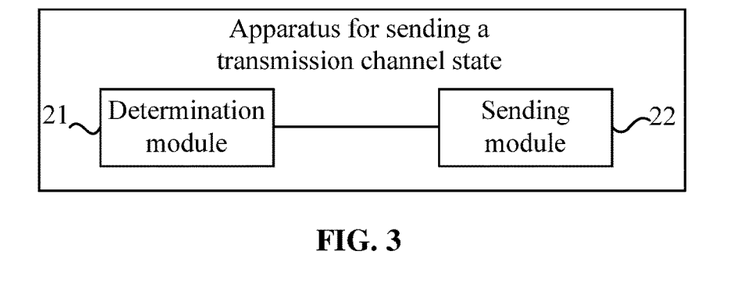
FIG. 3 is a block diagram of an apparatus for sending a channel state according to an embodiment of the present application.

FIG. 3 is a block diagram of an apparatus for sending a channel state according to an embodiment of the present application. As shown in FIG. 3, the apparatus includes a determination module 21 and a sending module 22. The determination module 21 is configured to determine a channel state report for characterizing a channel state comprising a precoding matrix. The sending module 22 is configured to send the channel state report for characterizing the channel state comprising the precoding matrix. The channel state report includes: a number of reported coefficients in coefficient matrixes for the precoding matrix and the reported coefficients in the coefficient matrixes for the precoding matrix. The reported coefficients in the coefficient matrixes for the precoding matrix are used for indicating the precoding matrix.

The apparatus for sending a channel state of an embodiment of the present application includes a determination module 31 and a sending module 32. The determination module 31 is configured to determine a channel state report for characterizing a channel state comprising a precoding matrix. The sending module 32 is configured to send the channel state report for characterizing the channel state comprising the precoding matrix. The channel state report includes: a number of reported coefficients in coefficient matrixes for the precoding matrix and the reported coefficients in the coefficient matrixes for the precoding matrix. The reported coefficients in the coefficient matrixes for the precoding matrix are used for indicating the precoding matrix. A spatial domain dimension of the coefficient matrixes for the precoding matrix is obtained according to the number of the reported coefficients in the coefficient matrixes for the precoding matrix. The spatial domain dimension of the coefficient matrixes for the precoding matrix is used for characterizing a number of spatial domain vectors composing the precoding matrix.

In an exemplary implementation, a frequency domain dimension of the coefficient matrixes for the precoding matrix is determined by the number of the reported coefficients in the coefficient matrixes for the precoding matrix. The frequency domain dimension of the coefficient matrixes for the precoding matrix is used for characterizing a number of frequency domain vectors composing the precoding matrix.

In an exemplary implementation, a rank of the precoding is determined by the number of the reported coefficients in the coefficient matrixes for the precoding matrix.

In an exemplary implementation, an information content of the channel state report is determined by the number of the reported coefficients in the coefficient matrixes for the precoding matrix.

In an exemplary implementation, the channel state report is indicated by a first field, and a state of the first field includes a first state set and a second state set. The number of the reported coefficients in the coefficient matrixes for the precoding matrix is indicated according to a state in the first state set of the first field. The precoding is indicated according to a state in the second state set of the first field. Herein, "first" in the first field, "first" in the first state set and "second" in the second state set are used merely for descriptive differentiation and do not represent orders.

In an exemplary implementation, the channel state report includes two parts. A first part of the channel state report is mapped on a first sequence. A second part of the channel state report is mapped on a second sequence, where the second part includes N fragments, and N is an integer greater than 1.

In an exemplary implementation, the number N of the fragments included in the second part of the channel state report is included in the first part of the channel state report.

In an exemplary implementation, the second part of the channel state report includes at least two fragments, and a first fragment of the at least two fragments has a higher priority than other fragments sequenced after the first fragment. A matrix indicating the reported coefficients in the coefficient matrixes for the precoding matrix is included in the first fragment. The reported coefficients in the coefficient matrixes for the precoding matrix are included in other fragments sequenced after the first fragment.

In an exemplary implementation, the second part of the channel state report includes at least two fragments, a first fragment of the at least two fragments has a higher priority than other fragments sequenced after the first fragment, and a second fragment has a higher priority than other fragments sequenced after the second fragment. Portion of a matrix indicating the reported coefficients in the coefficient matrixes for the precoding matrix and correspondingly-indicated reported coefficients in the coefficient matrixes for the precoding matrix are included in the second fragment.

In an exemplary implementation, the second part of the channel state report includes at least two fragments, a first fragment of the at least two fragments has a higher priority than other fragments sequenced after the first fragment, and a second fragment has a higher priority than other fragments sequenced after the second fragment. Part of the reported coefficients in the coefficient matrixes for the precoding matrix is included in the second fragment. The reported coefficients in the coefficient matrixes for the precoding matrix are divided according to columns of the coefficient matrixes for the precoding matrix.

In an exemplary implementation, the number of the reported coefficients in the coefficient matrixes for the precoding matrix is determined by a number of resources used by the channel state report.

In an exemplary implementation, the frequency domain dimension of the coefficient matrixes for the precoding matrix is determined by a number of resources used by the channel state report.

In an exemplary implementation, the number N of the fragments included in the second part of the channel state report is determined by a number of resources used by the channel state report.

In an exemplary implementation, the channel state report includes: a location of a precoding frequency domain unit supplemented in the channel state report.

In an exemplary implementation, the number of the reported coefficients in the coefficient matrixes for the precoding matrix is reported according to fragments.

Figure 4:
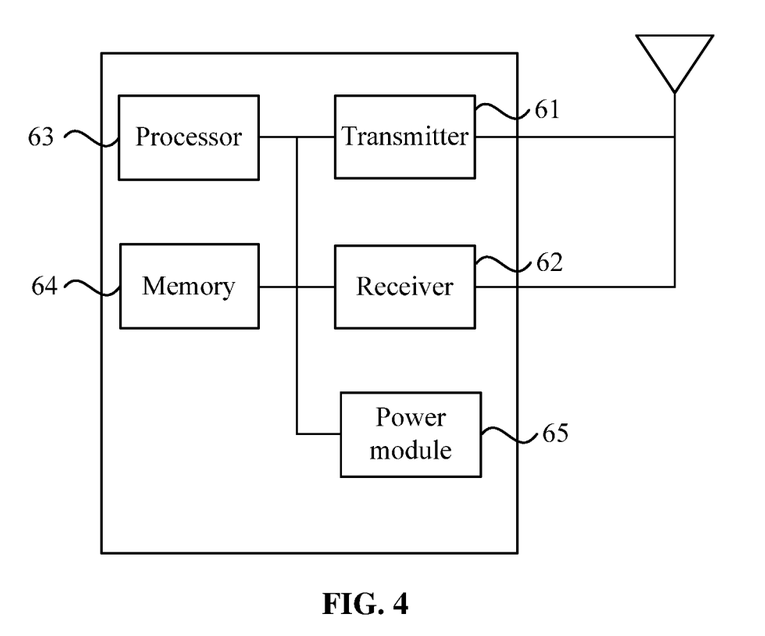
FIG. 4 is a diagram showing hardware of an apparatus for sending a channel state according to an embodiment of the present application.

FIG. 4 is a diagram showing hardware of an apparatus for sending a channel state according to an embodiment of the present application. The apparatus for sending a channel state may be located on the terminal device side. As shown in FIG. 4, the terminal device may include a mobile terminal such as a mobile phone, a smart phone, a laptop, a digital broadcast receiver, a personal digital assistant (PDA), a portable android device (PAD), a portable media player (PMP) and a navigation apparatus, and a fixed terminal such as a digital television (TV) and a desktop computer. It is assumed that the terminal is a mobile terminal hereinafter. The construction according to the implementation of the present disclosure also be applied to fixed types of terminals, in addition to elements specifically intended for mobile purposes.

The terminal device may include a wireless communication unit which may be composed of a transmitter 61 and a receiver 62, a memory 63, a processor 64, and a power unit 65 that are shown in the figure. The figure illustrates the terminal device with multiple assemblies; however, it is not required to implement all the illustrated assemblies. More or fewer assemblies may be implemented instead. The preceding transmitter may be a physical component of the sending module in this implementation, and the processor may be the determination module in this implementation.

Figure 5:
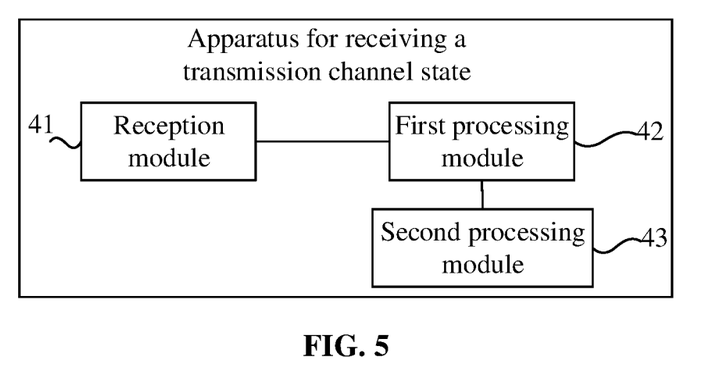
FIG. 5 is a block diagram of an apparatus for receiving a channel state according to an embodiment of the present application.

FIG. 5 is a block diagram of an apparatus for receiving a channel state according to an embodiment of the present application. As shown in FIG. 5, the apparatus includes a reception module 41, a first processing module 42 and a second processing module 43. The reception module 41 is configured to receive a channel state report for characterizing a channel state comprising a precoding matrix. The channel state report includes: a number of reported coefficients in coefficient matrixes for the precoding matrix and the reported coefficients in the coefficient matrixes for the precoding matrix. The first processing module 42 is configured to receive the reported coefficients in the coefficient matrixes for the precoding matrix according to the number of the reported coefficients in the coefficient matrixes for the precoding matrix. The second processing module 43 is configured to acquire The precoding matrix according to the reported coefficients in the coefficient matrixes for the precoding matrix.

In an exemplary implementation, a spatial domain dimension of the coefficient matrixes for the precoding matrix is determined by the number of the reported coefficients in the coefficient matrixes for the precoding matrix. The spatial domain dimension of the coefficient matrixes for the precoding matrix is used for characterizing a number of spatial domain vectors composing the precoding matrix.

In an exemplary implementation, a frequency domain dimension of the coefficient matrixes for the precoding matrix is determined by the number of the reported coefficients in the coefficient matrixes for the precoding matrix. The frequency domain dimension of the coefficient matrixes for the precoding matrix is used for characterizing a number of frequency domain vectors composing the precoding matrix.

In an exemplary implementation, a rank of the precoding is determined by the number of the reported coefficients in the coefficient matrixes for the precoding matrix.

In an exemplary implementation, an information content of the channel state report is determined by the number of the reported coefficients in the coefficient matrixes for the precoding matrix.

In an exemplary implementation, the channel state report is indicated by a first field, and a state of the first field includes a first state set and a second state set. The number of the reported coefficients in the coefficient matrixes for the precoding matrix is indicated according to a state in the first state set of the first field. The precoding is indicated according to a state in the second state set of the first field.

In an exemplary implementation, the channel state report includes two parts. A first part of the channel state report is mapped on a first sequence. A second part of the channel state report is mapped on a second sequence, where the second part includes N fragments, and N is an integer greater than 1.

In an exemplary implementation, the number N of the fragments included in the second part of the channel state report is included in the first part of the channel state report.

In an exemplary implementation, the second part of the channel state report includes at least two fragments, and a first fragment of the at least two fragments has a higher priority than other fragments sequenced after the first fragment. A matrix indicating the reported coefficients in the coefficient matrixes for the precoding matrix is included in the first fragment, and the reported coefficients in the coefficient matrixes for the precoding matrix are included in other fragments sequenced after the first fragment.

In an exemplary implementation, the second part of the channel state report includes at least two fragments, a first fragment of the at least two fragments has a higher priority than other fragments sequenced after the first fragment, and a second fragment has a higher priority than other fragments sequenced after the second fragment. Portion of a matrix indicating the reported coefficients in the coefficient matrixes for the precoding matrix and correspondingly-indicated reported coefficients in the coefficient matrixes for the precoding matrix are included in the second fragment.

In an exemplary implementation, the second part of the channel state report includes at least two fragments, a first fragment of the at least two fragments has a higher priority than other fragments sequenced after the first fragment, and a second fragment has a higher priority than other fragments sequenced after the second fragment. Part of the reported coefficients in the coefficient matrixes for the precoding matrix is included in the second fragment. The reported coefficients in the coefficient matrixes for the precoding matrix are divided according to columns of the coefficient matrixes for the precoding matrix.

In an exemplary implementation, the number of the reported coefficients in the coefficient matrixes for the precoding matrix is determined by a number of resources used by the channel state report.

In an exemplary implementation, the frequency domain dimension of the coefficient matrixes for the precoding matrix is determined by a number of resources used by the channel state report.

In an exemplary implementation, the number N of the fragments included in the second part of the channel state report is determined by a number of resources used by the channel state report.

In an exemplary implementation, the channel state report includes: a location of a precoding frequency domain unit supplemented in the channel state report.

In an exemplary implementation, the number of the reported coefficients in the coefficient matrixes for the precoding matrix is reported according to fragments.

Figure 6:
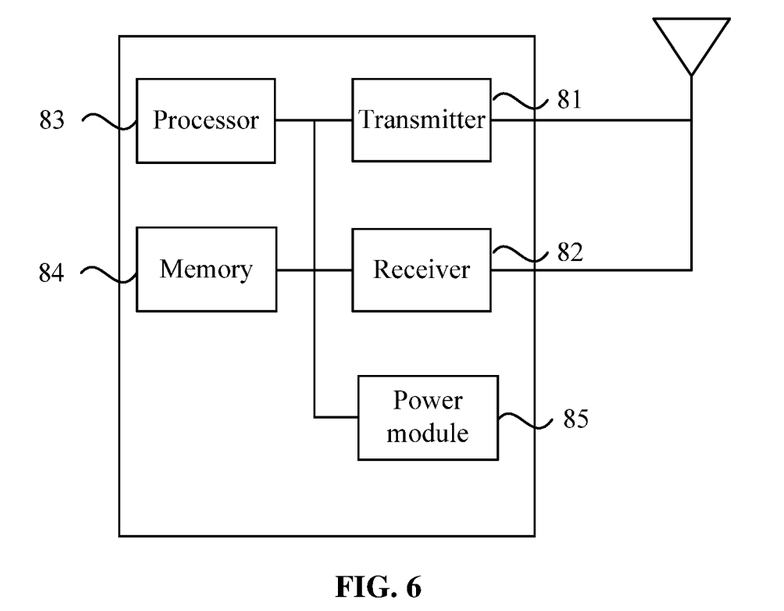
FIG. 6 is a diagram showing hardware of an apparatus for receiving a channel state according to an embodiment of the present application.

FIG. 6 is a diagram showing hardware of an apparatus for receiving a channel state according to an embodiment of the present application. The apparatus for receiving a channel state may be located on the network device side, such as the base station side. As shown in FIG. 6, the base station side includes a transmitter 81, a receiver 82, a power module 85, a memory 84 and a processor 83. The receiver may be the preceding reception module, and the processor may include the preceding first processing module and second processing module.

Figure 7:
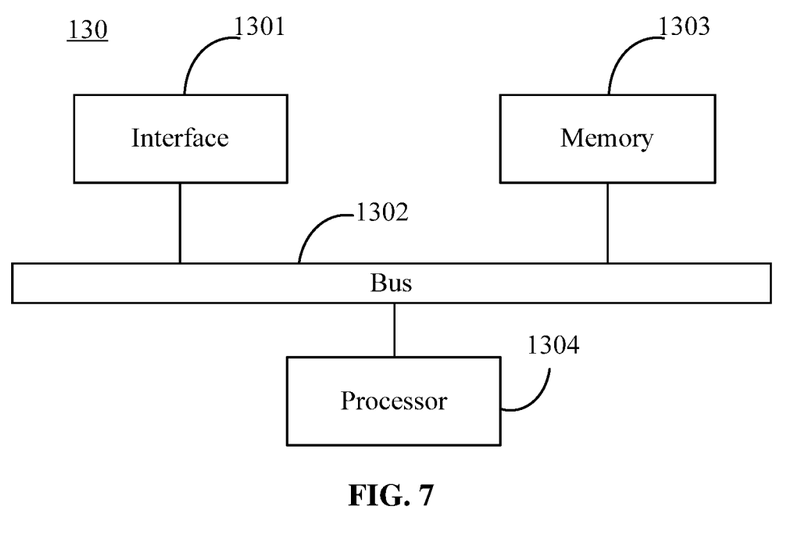
FIG. 7 is a structural diagram of an embodiment in which an apparatus for sending a channel state is located in a terminal device according to an embodiment of the present application.

FIG. 7 is a structural diagram of an embodiment in which an apparatus for sending a channel state is located in a terminal device according to an embodiment of the present application. As shown in FIG. 7, the terminal device 130 includes: a memory 1303 and a processor 1304. The terminal device 130 may further include an interface 1301 and a bus 1302. The interface 1301, the memory 1303 and the processor 1304 are connected through the bus 1302. The memory 1303 is configured to store instructions. The processor 1304 is configured to read the instructions to execute the technical solutions of the preceding method embodiments applied to the terminal device. The implementation principles and technical effects are similar and are not repeated here.

Figure 8:
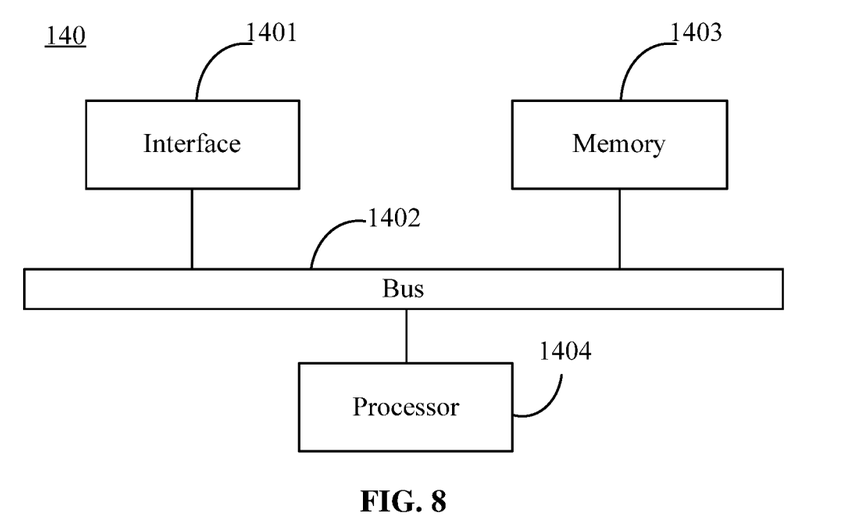
FIG. 8 is a structural diagram of an embodiment in which an apparatus for receiving a channel state is located in a base station according to an embodiment of the present application.

FIG. 8 is a structural diagram of an embodiment in which an apparatus for receiving a channel state is located in a base station according to an embodiment of the present application. As shown in FIG. 8, the base station 140 provided by the embodiment of the present application includes: a memory 1403 and a processor 1404. The base station may further include an interface 1401 and a bus 1402. The interface 1401, the memory 1403 and the processor 1404 are connected through the bus 1402. The memory 1403 is configured to store instructions. The processor 1404 is configured to read the instructions to execute the technical solutions of the preceding method embodiments applied to the base station. The implementation principles and technical effects are similar and are not repeated here.

Figure 9:
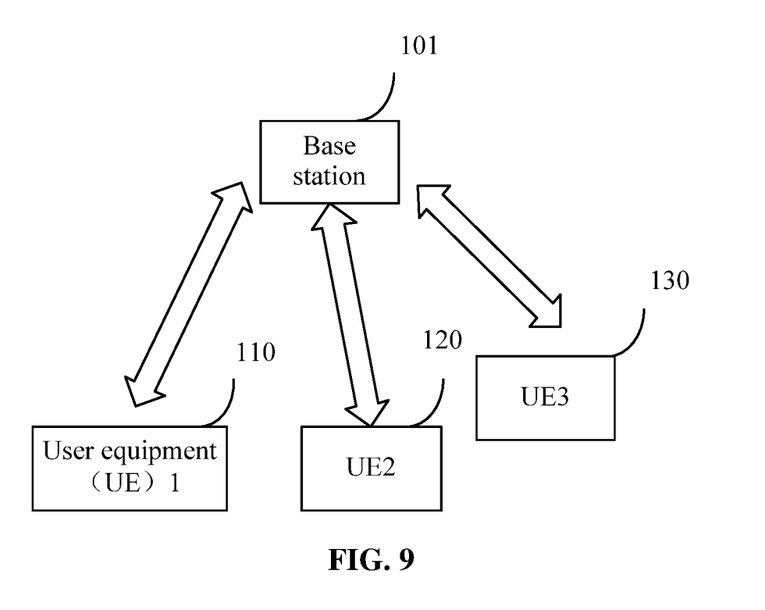
FIG. 9 is a diagram showing the structure of a communication system according to an embodiment of the present application.
Figure 10:
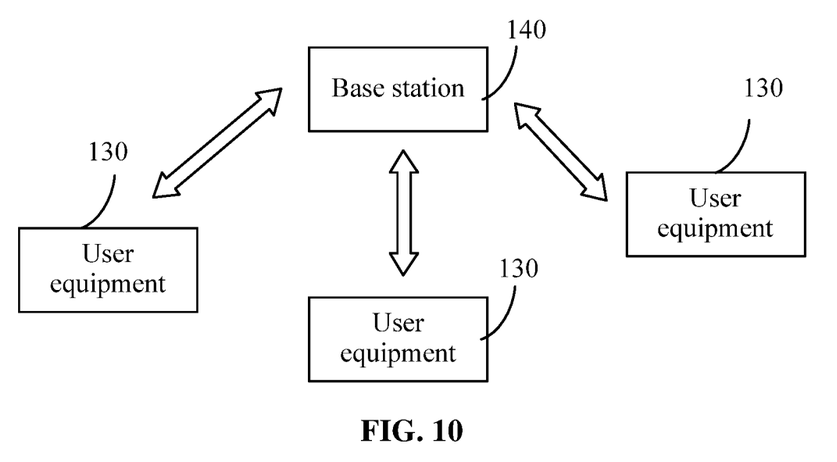
FIG. 10 is a diagram showing the structure of another communication system according to an embodiment of the present application.

FIGS. 9 to 10 are two diagrams showing the structure of a communication system according to an embodiment of the present application. As shown in FIG. 9, in this implementation, the description is provided by taking an example in which the network side device is a base station 101, and the terminal device may be a user equipment (UE) 110, a UE 120, or a UE 130 in the figure. The functions of the preceding base station and UE are the same as the preceding implementations and are not repeated. Alternatively, as shown in FIG. 10, the system includes: the user equipment 130 of the preceding embodiment and the base station 140 of the preceding embodiment. Similarly, the base station in the figure may be the network device in the embodiments, the user equipment is the preceding terminal device, and the functions that can be achieved are the same as the preceding functions, which are not repeated here.

The above are merely exemplary embodiments of the present application and are not intended to limit the scope of the present application.

The term user terminal encompasses any appropriate type of wireless user device, such as a mobile phone, a portable data processing apparatus, a portable web browser or a vehicle-mounted mobile station.

Various embodiments of the present application may be implemented in hardware or special-purpose circuits, software, logic, or any combination thereof. For example, some aspects may be implemented in hardware while other aspects may be implemented in firmware or software that may be executed by a controller, a microprocessor or other computing apparatuses, although the present application is not limited thereto.

The embodiments of the present application may be implemented by a data processor of a mobile apparatus executing computer program instructions. The implementation, for example, may be in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in drawings of the present application may represent program steps, or may represent interconnected logic circuits, modules and functions, or may represent a combination of program steps, logic circuits, modules, and functions. The computer program may be stored in a memory. The memory may be of any type suitable for a local technical environment and may be implemented using any suitable data storage technology. The memory in the embodiments of the present application may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), a flash memory or the like. The volatile memory may be a random-access memory (RAM), which serves as an external cache. Many forms of RAMs may be used, such as a static RAM (SRAM), a dynamic RAM (DRAM), a synchronous DRAM (SDRAM), a double data rate SDRAM (DDR SDRAM), an enhanced SDRAM (ESDRAM), a sync link DRAM (SLDRAM), and a direct rambus RAM (DRRAM). The memory of the system and the method described in the present application includes, but is not limited to, these and any other suitable types of memory.

The processor of the embodiments of the present application may be of any type suitable for the local technical environment such as, but not limited to, a general-purpose computer, a special-purpose computer, a microprocessor, a digital signal processor (DSP), an application specific integrated circuit (ASIC), a field-programmable gate array (FPGA), any other programmable logic device, a discrete gate or transistor logic device, a discrete hardware component and a processor based on a multi-core processor architecture. The general-purpose processor may be, for example, a microprocessor or any conventional processor. The preceding processor may implement or execute the steps of the methods disclosed in the embodiments of the present application. Software modules may be located at a random-access memory, a flash memory, a read-only memory, a programmable read-only memory, an electrically erasable programmable read-only memory, a register or any other established storage medium in the art. The storage medium is located in the memory. The processor reads information in the memory and implements the steps of the preceding methods in combination with hardware of the processor.

What is claimed is:

1. A method for sending a channel state, comprising:
   determining a channel state report that characterizes a channel state, wherein the channel state report indicates a precoding matrix,
   wherein the channel state report comprises two parts,
   wherein a first part of the channel state report is mapped on a first sequence,
   wherein a second part of the channel state report is mapped on a second sequence, wherein the second part comprises a plurality of fragments,
   wherein the plurality of fragments correspond to a plurality of coefficients in coefficient matrixes for the precoding matrix,
   wherein the plurality of fragments have different priorities,
   wherein a first fragment of the plurality of fragments in the second part of the channel state report has a higher priority than other fragments from the plurality of fragments sequenced after the first fragment,
   wherein a second fragment of the plurality of fragments has a higher priority than other fragments from the plurality of fragments sequenced after the second fragment, wherein the second fragment comprises a portion of a matrix that indicates reported coefficients in the coefficient matrixes for the precoding matrix, wherein the second fragment comprises a portion of the reported coefficients in the coefficient matrixes for the precoding matrix, and wherein the portion of the reported coefficients corresponds to the portion of the matrix; and sending the channel state report.

2. A method for receiving a channel state, comprising:

receiving a channel state report that characterizes a channel state, wherein the channel state report indicates a precoding matrix, wherein the channel state report comprises two parts, wherein a first part of the channel state report is mapped on a first sequence, wherein a second part of the channel state report is mapped on a second sequence, wherein the second part comprises a plurality of fragments, wherein the plurality of fragments correspond to a plurality of coefficients in coefficient matrixes for the precoding matrix, wherein the plurality of fragments have different priorities, wherein a first fragment of the plurality of fragments in the second part of the channel state report has a higher priority than other fragments from the plurality of fragments sequenced after the first fragment, wherein a second fragment of the plurality of fragments has a higher priority than other fragments from the plurality of fragments sequenced after the second fragment, wherein the second fragment comprises a portion of a matrix that indicates reported coefficients in the coefficient matrixes for the precoding matrix, wherein the second fragment comprises a portion of the reported coefficients in the coefficient matrixes for the precoding matrix, and wherein the portion of the reported coefficients corresponds to the portion of the matrix.

3. The method according to claim 1, wherein the channel state report comprises: a number of reported coefficients in coefficient matrixes for the precoding matrix, and the reported coefficients in the coefficient matrixes for the precoding matrix.

4. The method according to claim 2, wherein the channel state report comprises: a number of reported coefficients in coefficient matrixes for the precoding matrix, and the reported coefficients in the coefficient matrixes for the precoding matrix.

5. A wireless communication apparatus, comprising a processor configured to perform a method, the processor configured to:

determine a channel state report that characterizes a channel state, wherein the channel state report indicates a precoding matrix, wherein the channel state report comprises two parts, wherein a first part of the channel state report is mapped on a first sequence, wherein a second part of the channel state report is mapped on a second sequence, wherein the second part comprises a plurality of fragments, wherein the plurality of fragments correspond to a plurality of coefficients in coefficient matrixes for the precoding matrix, wherein the plurality of fragments have different priorities, wherein a first fragment of the plurality of fragments in the second part of the channel state report has a higher priority than other fragments from the plurality of fragments sequenced after the first fragment, wherein a second fragment of the plurality of fragments has a higher priority than other fragments from the plurality of fragments sequenced after the second fragment, wherein the second fragment comprises a portion of a matrix that indicates reported coefficients in the coefficient matrixes for the precoding matrix, wherein the second fragment comprises a portion of the reported coefficients in the coefficient matrixes for the precoding matrix, and wherein the portion of the reported coefficients corresponds to the portion of the matrix; and sending the channel state report.

6. The wireless communication apparatus according to claim 5, wherein the channel state report comprises: a number of reported coefficients in coefficient matrixes for the precoding matrix, and the reported coefficients in the coefficient matrixes for the precoding matrix.

7. A wireless communication apparatus, comprising a processor configured to perform a method, the processor configured to:

receive a channel state report that characterizes a channel state, wherein the channel state report indicates a precoding matrix, wherein the channel state report comprises two parts, wherein a first part of the channel state report is mapped on a first sequence, wherein a second part of the channel state report is mapped on a second sequence, wherein the second part comprises a plurality of fragments, wherein the plurality of fragments correspond to a plurality of coefficients in coefficient matrixes for the precoding matrix, wherein the plurality of fragments have different priorities, wherein a first fragment of the plurality of fragments in the second part of the channel state report has a higher priority than other fragments from the plurality of fragments sequenced after the first fragment, wherein a second fragment of the plurality of fragments has a higher priority than other fragments from the plurality of fragments sequenced after the second fragment, wherein the second fragment comprises a portion of a matrix that indicates reported coefficients in the coefficient matrixes for the precoding matrix, wherein the second fragment comprises a portion of the reported coefficients in the coefficient matrixes for the precoding matrix, and wherein the portion of the reported coefficients corresponds to the portion of the matrix.

8. The wireless communication apparatus according to claim 7, wherein the channel state report comprises: a number of reported coefficients in coefficient matrixes for the precoding matrix, and the reported coefficients in the coefficient matrixes for the precoding matrix.

* * * * *